United States Patent [19]

Rygg et al.

[11] Patent Number: 4,998,227

[45] Date of Patent: Mar. 5, 1991

[54] DEVICE FOR SEISMIC EXPLORATION

[75] Inventors: Eivind Rygg, Espeland; Karstein Rod, Birkeland, both of Norway

[73] Assignee: Norsk Hydro A.S., Oslo, Norway

[21] Appl. No.: 425,842

[22] Filed: Oct. 23, 1989

[30] Foreign Application Priority Data

Dec. 9, 1988 [NO] Norway .................. 885497

[51] Int. Cl.$^5$ .................. G01V 1/16; G01V 1/38
[52] U.S. Cl. .................. 367/177; 367/165; 367/130
[58] Field of Search .................. 367/106, 130, 154, 165, 367/177, 37; 114/253

[56] References Cited

U.S. PATENT DOCUMENTS

| | | | |
|---|---|---|---|
| 2,923,916 | 2/1960 | Woodworth | 367/130 |
| 3,786,410 | 1/1974 | Hazelhurst | 367/177 |
| 3,866,162 | 2/1975 | Florian | 367/177 |
| 3,954,154 | 5/1976 | Kruppenbach et al. | 367/177 |
| 4,491,939 | 1/1985 | Carpenter | 367/154 |
| 4,524,436 | 6/1985 | Hall et al. | 367/154 |
| 4,649,530 | 3/1987 | Porter | 367/154 |
| 4,685,090 | 8/1987 | Krevor | 367/154 |
| 4,734,891 | 3/1988 | McGowan | 367/106 |

Primary Examiner—Nelson Moskowitz
Attorney, Agent, or Firm—Wenderoth, Lind & Ponack

[57] ABSTRACT

A device for seismic exploration is in the form of a towed streamer. The streamer is easily managed, is very flexible and has a low weight so that it may be towed with moderate tractive forces. The streamer includes a cable with an inner core, one or more layers of insulated conductor pairs and an outer low-friction protective coating. Both the core and the outer low-friction protective layer are of an acoustically substantially inert material of low specific gravity. Seismic signals are obtained series connected gimbal-mounted geophones arranged in strings connected to the cable at positions spaced longitudinally thereof.

18 Claims, 5 Drawing Sheets

DEVICE FOR SEISMIC EXPLORATION

BACKGROUND OF THE INVENTION

The present invention relates to a device for seismic exploration and specially designed for ice- and snow-covered regions, but also applicable on other surfaces on land or on the sea-bed.

Until now land-based prospecting techniques have been very labor intensive and time-consuming, and have not had the functional or economic efficiency which is at present available for marine seismic surveying.

Several suggestions have therefore been made for improvements of land-based seismic operations, for example the use of a towed main cable (streamer) to which subsidiary cables with automatically adjustable receiving instruments (geophones) are attached at suitable intervals. In order to use such towed systems on a solid surface it has until now been considered important that the cable system be able to withstand severe stresses and be so thick and strong that it can be towed within the area of operation. In snow- and ice-covered regions one has the additional risk that the cable may sink into the snow- and ice-cover and freeze therein, thus increasing the strength/stress requirements.

Such a streamer system designed for use on snow and ice surfaces is known from U.S. Pat. No. 3,954,154 to Kruppenbach et al. Furthermore, a method for mechanized land prospecting using such known streamer is known from U.S. Pat. No. 3,923,121 to Bendenbender et al. Such known streamer has a main cable composed of individual sections linked by means of connectors. A number of side strings with individual geophones are connected to the main cable with the geophones interconnected within the main cable. A tensile core consisting of seven steel wires is arranged in the central region of the cable in order to withstand a minimum force of eight tons (16,000 pounds). The steel core alone will thus have a diameter of at least 12 mm, and the resulting cable with surrounding rubber coating, conductor pairs, covering foils and outer mantle will weight several kilograms per meter and have a substantial diameter of 40-60 mm or more. A streamer using such a cable will be very heavy and can be stiff and unmanageable, similar to a heavy steel hawser, and is therefore not well suited for use in arctic regions. In addition, the steel wires will be acoustically active and possibly impair the signal quality. Such construction is therefore not suitable for full-scale commercial seismic operations, and in the above-mentioned patent no information is forthcoming on how the streamer concept has behaved in practical trials, or on results achieved.

SUMMARY OF THE INVENTION

Thus, it is the main object of the invention to provide an easily managed, towable device giving faster and cheaper data collection without adversely affecting the quality of the signals received, and also achieving results as good as or better than those obtainable by conventional techniques.

It is a further object of the invention to create a streamer which is essentially acoustically inert and does not reduce the quality of the signals recorded by the geophones and receiving instruments.

Yet another object of the invention is to produce a streamer which behaves like a flexible rope, is lightweight and floats upon or glides over the surface with low friction, which is easy to pull and which can serve a large number of geophones.

In addition, another object of the invention is to provide such a streamer that is prevented from freezing in place during stoppages of towing of some duration and whereby operation easily may be restarted even if the streamer is covered by snow or similar material.

These objects are achieved according to the invention by the provision of a device for seismic exploration comprising a towing arrangement, a towed cable formed of several linked sections with an inner tension member or core to withstand the towing force, one or more layers composed of insulated conductor pairs of copper or similar material for the transmission of received signals, an outer low-friction protective coating surrounding and protecting the core and conductor pairs, together with a number of strings of geophones or seismic receiving instruments which are arranged outside the cable and which are electrically and mechanically connected to it. The device is characterized by the employment of low density, acoustically substantially inert, material for both the tension member as well as the outer low-friction protective coating.

BRIEF DESCRIPTION OF THE DRAWINGS

Other objects, advantages and characteristics of the invention will be apparent from the following description taken with the accompanying drawings, wherein.

DETAILED DESCRIPTION OF THE INVENTION

Figure 1:
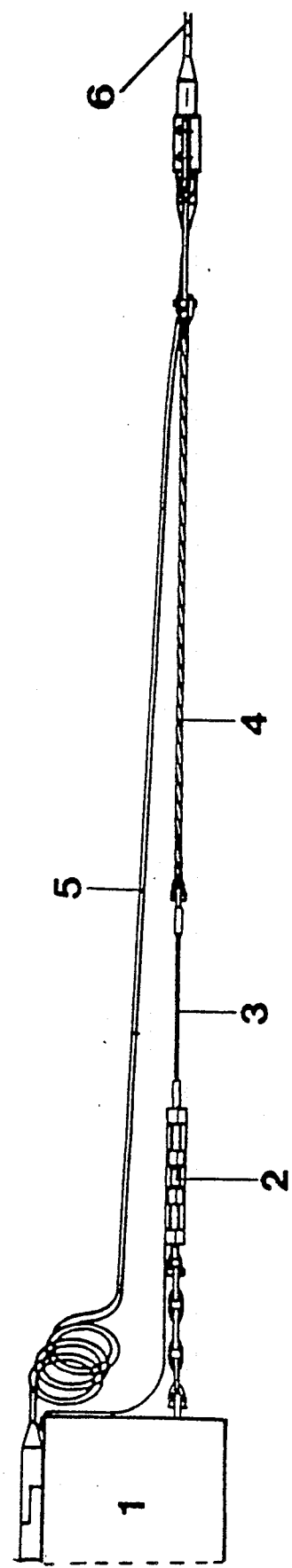
FIG. 1 is an elevation view of a streamer with a towing arrangement.

The main components in an operative device for seismic exploration are a streamer comprising a towing device, active sections and geophone strings. The entire such device or system (FIG. 1) is towed by a terrain vehicle 1 which also contains recording units and associated equipment. During start and while moving, the tractive force being used at any time is measured by a strain-gauge 2 and the result shown on a display device in the cabin of the vehicle. Between the strain-gauge 2 and an acoustically inert tow-rope or cable 4 is a safety wire 3 with a breaking strength of about 1.2 tons. Active sections 6 of the device are pulled by the tow-rope 4, while seismic signals are transmitted to the recording units by a slack extension cable 5.

Figure 2:
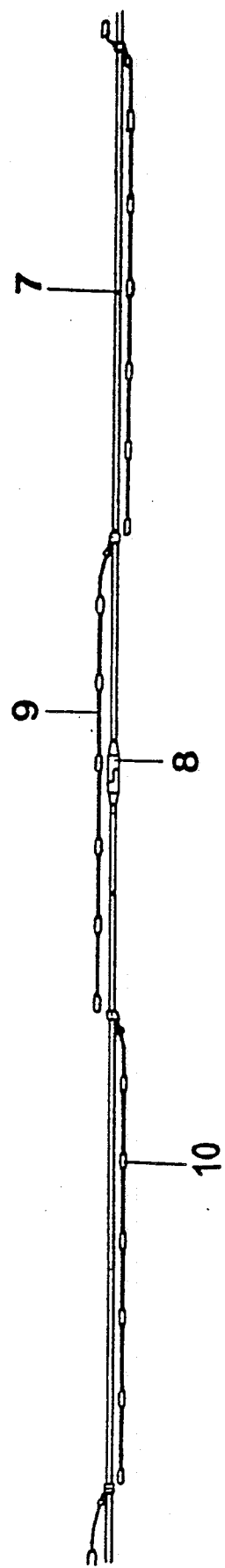
FIG. 2 is a similar view of sections of a main cable of the streamer with attached subsidiary cables.

The active sections or snow-streamer itself (FIG. 2) is a cable 7 consisting of several units or sections, for example six units each of 250 m length. The units are connected by means of quick-release connectors 8. A number of auxiliary cables or geophone strings 9 are attached to the cable 7, and string 9 carrying a number of receiving instruments or geophones 10. The geophones 10 of each string 9 are series connected outside the main cable 7, thus reducing the stiffness and diameter of the main cable.

The cable 7 is in sections in order to:

spread the elongation due to stretching during operation over several sections, facilitate assembly/disassembly, mobilization/ demobilization, and enable the replacement and repair of defective components while operations are in progress.

Figure 3:
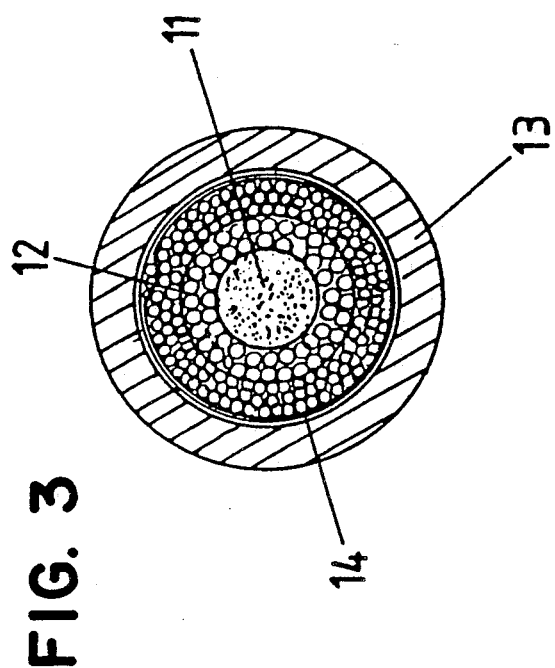
FIG. 3 is a cross-sectional view of the main cable.

The cable 7 (FIG. 3) has at its center a core or tension member 11 of acoustically substantially inert material which is flexible and of low density, then outwardly thereof three layers 12 of plastic insulated conductor pairs of copper for signal transmission. The tension member 11 has a diameter of 6.9 mm and a breaking strength of 3000 kg Kevlar ®, a synthetic aromatic polyamide fiber with a specific gravity of 1.15 produced by DuPont is employed as the inert material. Externally the cable is covered by a low-friction protective coating 13 of elastomer material, e.g. an acoustically substantially inert material with great flexibility and low friction. The main cable has a diameter of 19.2 mm and the weight is 400 g per meter. The breaking strength of the tensile element (core) can therefore be as low as three tons for a 1500 m cable which is to be used in snow/ice covered areas. A thin metal coated plastic foil 14 is placed between the conductor pairs 12 and the low-friction protective coating 13.

The low-friction protective coating 13 is colored off-white in order to avoid the risk that stoppages of towing of duration would lead to melting and later refreezing of snow/ice next to the cable. The protective coating has a thickness of 2.6 mm and is guaranteed for temperatures between −51° C. and +107° C. It is flexible and slips easily over all solid surfaces. The low-friction protective coating is made of Hytrel ®, a thermoplastic polyester with a specific gravity of 1.24 and produced by DuPont.

Figure 4:
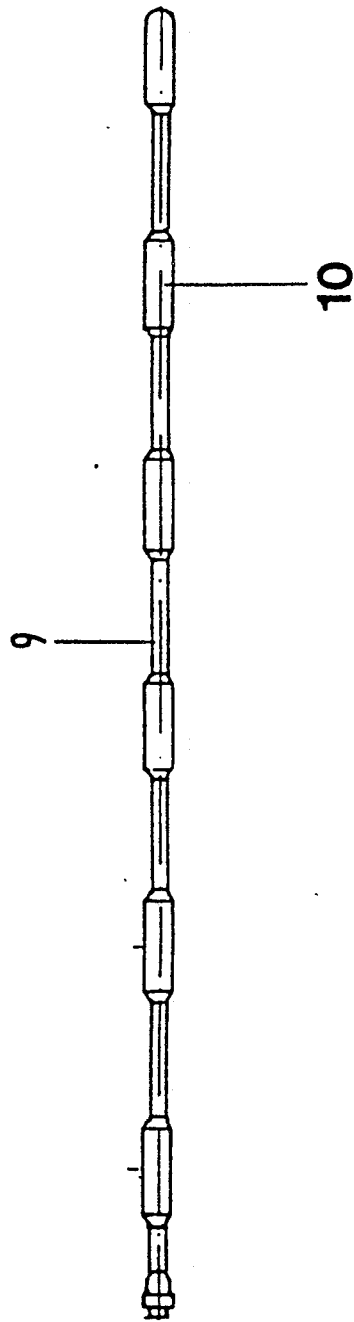
FIG. 4 is an elevation view of a single auxiliary cable or geophone string.

The seismic signals are obtained by means of receiving instruments 10 (geophones) which are molded into the auxiliary cables or geophone strings 9 at fixed intervals (FIG. 4). The receiving instruments 10 are series connected outside the main cable so that each geophone string comprises a group of geophones (antenna) of, for example, 25 m in length. Each group has six or more receiving instruments 10. With an average distance between connecting points of 25 m there are 60 seismic channels on a streamer which is 1500 m long, so that with six instruments per group there are 360 instruments. The receiving instruments 10 are half-gimballed, that is to say they always lie in a vertical plane coinciding with the direction of the geophone string.

At the points of attachment between the geophone strings 9 and the main cable 7 the breaking strength is 250 kg, while the breaking strength between individual instruments 10 in the geophone strings 9 is 85 kg. These specifications are chosen in order to obtain controlled breaking in the event of jamming of a receiving device 10 in the surface.

The entire system is waterproof and may be towed as a bottom cable. It is flexible in use and may be towed as one long unit or as several units in freely chosen geometric configurations. The system has been tested on ice/snow surfaces, but can, owing to the above-mentioned flexibility, be used on all sorts of suitable surfaces as well as under water.

According to the invention, construction materials with law specific gravity, preferably <1.3, and with good flexibility, must be chosen. For the core 11 synthetic fibers with a high tensile strength and low elongation may be used, for example aromatic polyamide or similar fibers. The external low-friction protective coating 13 must be resistant to abrasion and not crack or unravel even at low temperatures. It should preferably consist of a synthetic elastomer material such as Hytrel ®. By optimal choice of suitable materials it has been possible according to the invention to produce cables with a diameter of less than 25 mm, preferably less than 20 mm, with a weight of less than 500 g per meter, preferably under 400 g per meter. A 1500 m long streamer using such a main cable 7 and having 25 m long subsidiary cables each with six gimbal-mounted equidistant geophones may be towed over a snow/ice surface with a tractive force of ~300 kg.

The operation and function of the invention are briefly described in the following. The system is towed by a terrain vehicle. With the above dimensions and material specifications, and on a snow-ice surface, the tractive force measured by the strain gauge 2 is typically 250–300 kg while in motion and 400–600 kg while starting. After stoppages of some duration in operations with snowfall and wind, the cable 7 and geophone strings 9 easily may be loosened from the surface by quick rounds of inspection using a skidoo or on foot. During movement along straight lines the cable glides smoothly and simply makes tracks in the surface, and the operations are quite unproblematical. Operations while turning 180° are also quite unproblematical since the chosen materials are flexible even under conditions of extreme temperature. The cable behaves in fact like a flexible rope and may be easily coiled and uncoiled.

During operations a detonation unit will normally be ahead of the recording unit at a fixed distance from the latter. The detonation unit may use:

surface point charges
surface line charges (detonating cord)
buried charges
mechanical sources (e.g. vibrators)

The operations may be optimalized with respect to use of resources. As an example, the following distribution of tasks and crew members when using surface line charges (detonating cord) is recommended:

| Marking | 2 persons |
| --- | --- |
| Supply of explosives from depot | 2 persons |
| Emplacement of explosives | 2 persons |
| Detonating team | 2 persons |
| Recording team | 2 persons |
| Driver, towing vehicle | 1 person |
| | 11 persons |

Twenty-four hour continuous operations (2 shifts of 12 hours) can thus be run with 22 persons in all. The setup is then as follows. First, skidoos or tracked vehicles with required personnel carry out marking, emplacement and detonation. A skidoo is used for transport of ammunition and supplies. Then the towing vehicle, recording unit and snow-streamer follow.

Figure 5:
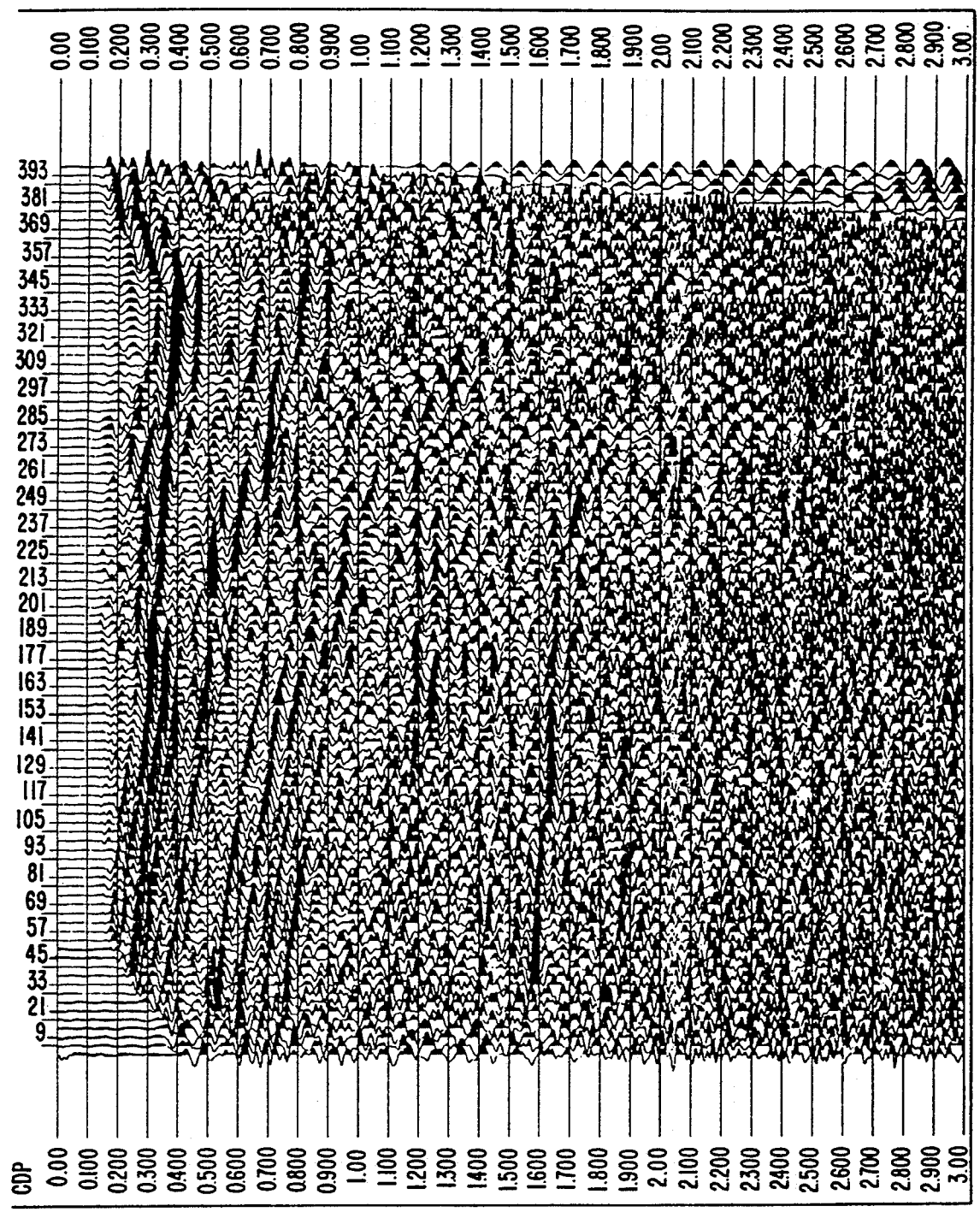
FIG. 5 is a graph showing a test line resulting from using conventional techniques and ordinary geophones.
Figure 6:
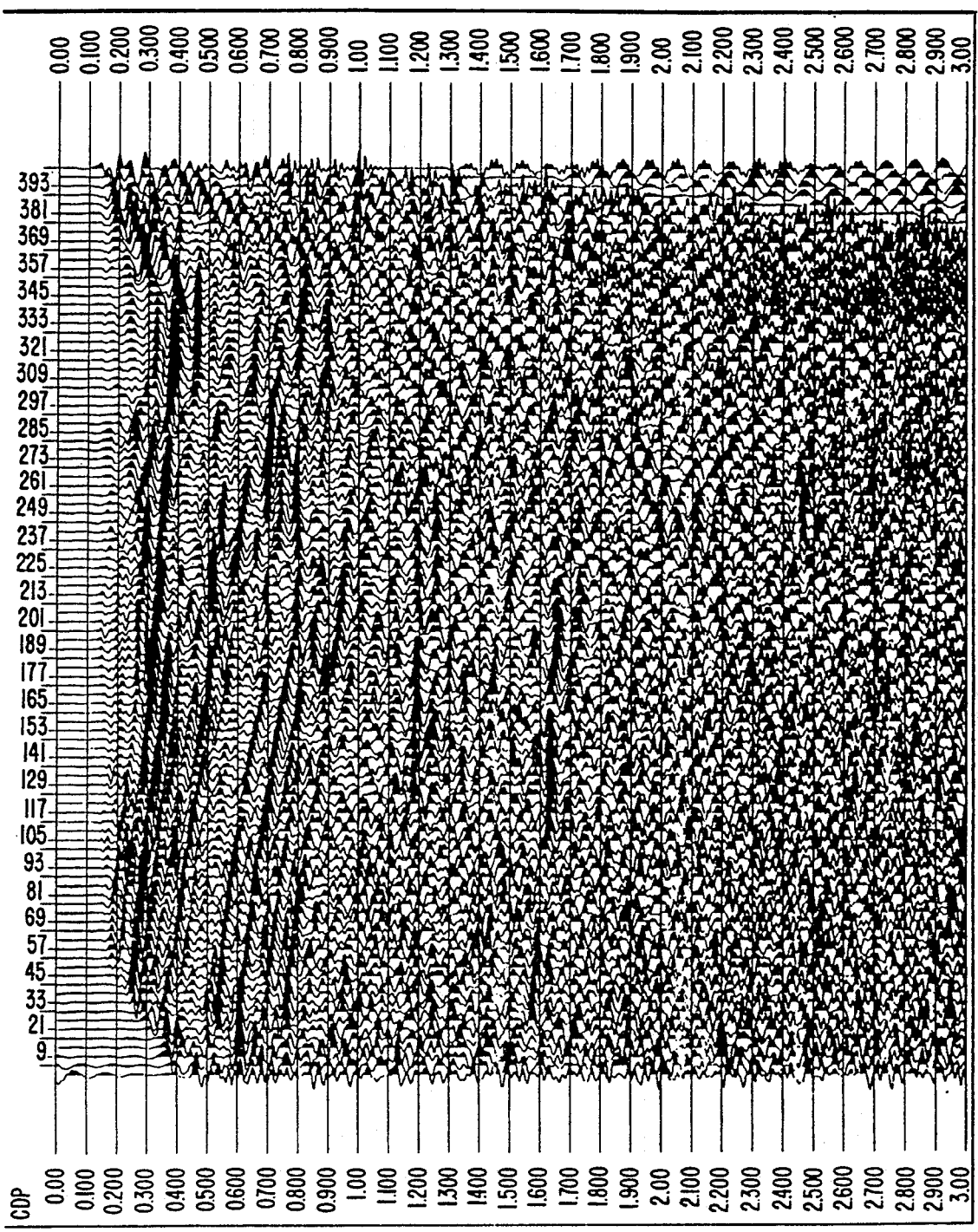
FIG. 6 is a graph showing a test line resulting from using the present invention.

The system has been tested during exploration on Spitsbergen, Svalbard, where extensive tests and comparisons with conventional systems have also been performed. The tests have given good and reproducible results. Representative comparisons are made in FIGS. 5 and 6 showing conventional system and the snow-streamer of the invention, respectively. FIGS. 5 and 6 show stack results obtained in as far as possible identical meteorological conditions (wind-free), source geoflex detonating cord 2×5−m (4 kg), shot-point interval 50 m, near-offset 287.5 and with 60 channels in 25 m groups. It is apparent from FIG. 6 that the streamer results are of high quality and as good as the results obtained by the conventional method as in FIG. 5.

At a normal pace and in reasonable terrain 60 shots per hour may be shot using the snow-streamer device of the invention, and with the above-mentioned shot pattern 3 km per hour may therefore be covered with a crew of 11 persons. It can thus be documented that the system functions efficiently in full-scale operations and that the results are reproducible.

The design shown in FIGS. 1-4 represents a preferred operative design only. The design of the snow-streamer itself may be changed within the framework of the invention with respect to length, number of active sections, number of geophone strings and number of geophones.

Furthermore, the detonating unit and transport units may be chosen on the basis of current needs and the characteristics of the terrain.

We claim:

1. An apparatus for seismic exploration to be towed on a land surface and suitable for use on ice/snow surfaces, said apparatus comprising:
   a towable main cable comprising a plurality of linked cable sections each formed by a core capable of absorbing the stress of towing, at least one layer surrounding said core and formed of insulated conductor pairs of electrically conductive material for the transmission of received signals, and a sheath surrounding and protecting said at least one layer of conductor pairs;
   a plurality of geophone strings connected to said main cable at positions spaced longitudinally thereof, each said geophone string having spaced therealong a plurality of geophones electrically connected to said main cable, each said geophone string being capable of being aligned to extend outwardly in varying directions from said main cable with said plurality of geophones of each said geophone string being located at different distances from said main cable;
   said core and said sheath each being formed of acoustically substantially inert material sufficient to substantially not interfere with seismic signals received by said geophones and transmitted to and by said at least one layer of conductor pairs; and
   said main cable having an outer diameter of less than 25 mm and a weight of less than 500 g per meter;
   whereby said main cable with geophone strings connected thereto has a degree of flexibility and ease of handling sufficient to enable the same to be wound or coiled in the manner of a rope and to glide over a ground surface under extreme temperature conditions.

2. An apparatus as claimed in claim 1, wherein said core is formed of a synthetic aromatic polyamide material.

3. An apparatus as claimed in claim 1, wherein said sheath is formed of a synthetic elastomer material.

4. An apparatus as claimed in claim 3, wherein said synthetic elastomer material comprises a flexible thermoplastic polyester that is resistant to wear and cracking.

5. An apparatus as claimed in claim 1, wherein said sheath is formed of a material having a light color and thereby forming means for preventing ice/snow from freezing about said main cable upon prolonged stoppage of towing thereof.

6. An apparatus as claimed in claim 1, wherein the weight of said main cable is less than 400 g per meter.

7. An apparatus as claimed in claim 1, wherein the outer diameter of said main cable is less than 20 mm.

8. An apparatus as claimed in claim 1, wherein at least one said geophone string has mounted thereon at least three said geophones.

9. An apparatus as claimed in claim 8, wherein each said geophone string has mounted thereon at least three said geophones.

10. An apparatus as claimed in claim 1, wherein at least one said geophone string has mounted thereon at least six said geophones.

11. An apparatus as claimed in claim 10, wherein each said geophone string has mounted thereon at least six said geophones.

12. An apparatus as claimed in claim 11, wherein said geophones of each said geophone string are equidistantly spaced therealong and are gimbal-mounted and the length of each said geophone string is at least 25 meters.

13. An apparatus as claimed in claim 1, further comprising an acoustically inert towing cable connected to said main cable.

14. An apparatus as claimed in claim 13, further comprising a safety wire connected to said towing cable and having a breaking strength less than that of said core of said main cable.

15. An apparatus as claimed in claim 14, further comprising a strain gauge connected to said safety wire for generating an indicia of tractive force applied to said main cable.

16. An apparatus as claimed in claim 1, wherein each said geophone string is connected to said main cable at a point of attachment having a controlled breaking strength, adjacent said geophones in each said geophone string are joined at points of connection having a controlled breaking strength, and said controlled breaking strength of said points of attachment are greater than said controlled breaking strength of said points of connection.

17. An apparatus as claimed in claim 16, wherein said controlled breaking strength of said points of attachment is less than the breaking strength of said core of said main cable.

18. An apparatus as claimed in claim 16, wherein said controlled breaking strength of said points of attachment is approximately 250 kg, and said controlled breaking strength of said points of connection is approximately 85 kg.

* * * * *